(12) United States Patent
Kaplan et al.

(10) Patent No.: US 12,194,934 B2
(45) Date of Patent: Jan. 14, 2025

(54) SMART SWITCH FOR VEHICLE SYSTEMS

(71) Applicant: SSV WORKS, INC., Oxnard, CA (US)

(72) Inventors: Trevor Kaplan, Newbury Park, CA
(US); Eleuterio Lopez, Camarillo, CA
(US); Jeremy Prater, Oxnard, CA (US)

(73) Assignee: SSV Works, Inc., Camarillo, CA (US)

( * ) Notice: Subject to any disclaimer, the term of this patent is extended or adjusted under 35 U.S.C. 154(b) by 0 days.

(21) Appl. No.: 17/570,377

(22) Filed: Jan. 6, 2022

(65) Prior Publication Data
US 2022/0410829 A1  Dec. 29, 2022

Related U.S. Application Data

(60) Provisional application No. 63/134,578, filed on Jan. 6, 2021.

(51) Int. Cl.
*B60R 16/03* (2006.01)
*G06F 3/04817* (2022.01)
*G06F 3/0488* (2022.01)
*G06F 3/14* (2006.01)

(52) U.S. Cl.
CPC ...... *B60R 16/0315* (2013.01); *G06F 3/04817* (2013.01); *G06F 3/0488* (2013.01); *G06F 3/14* (2013.01)

(58) Field of Classification Search
CPC ............ B60R 16/0315; G06F 3/04817; G06F 3/0488; G06F 3/14
See application file for complete search history.

(56) References Cited

U.S. PATENT DOCUMENTS

| 6,460,681 | B1 * | 10/2002 | Coutant | B65G 47/965 209/912 |
|---|---|---|---|---|
| 2008/0215240 | A1 * | 9/2008 | Howard | G06F 3/0488 348/148 |
| 2014/0298259 | A1 * | 10/2014 | Meegan | G06F 3/04817 715/810 |
| 2015/0134086 | A1 * | 5/2015 | Sugimoto | G05B 19/05 700/83 |
| 2017/0293370 | A1 * | 10/2017 | Hanaoka | G06F 3/0485 |
| 2018/0046161 | A1 * | 2/2018 | Yhr | B60W 50/023 |
| 2021/0155093 | A1 * | 5/2021 | Catron | B60K 35/00 |

FOREIGN PATENT DOCUMENTS

DE  102017109297 A1 * 11/2017 ......... B60R 16/0239

* cited by examiner

*Primary Examiner* — Sahlu Okebato
(74) *Attorney, Agent, or Firm* — Ferguson Case Orr Paterson LLP

(57) ABSTRACT

Embodiments of the present disclosure provide a smart switch devices for vehicle subsystems or electronic control units (ECUs). One embodiment of a smart switch comprises a programmable interface and a main switch box that may be controlled using the interface.

9 Claims, 25 Drawing Sheets

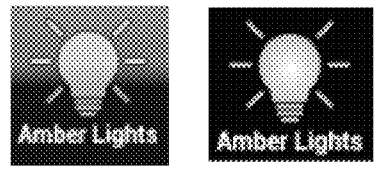
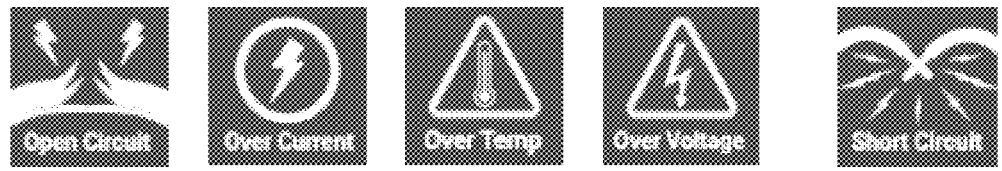
Example: Hazards Button has no output function in this scenario it is simply used to trigger both left and right arrow blinkers at the same time.
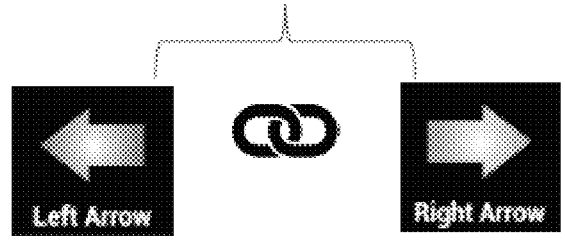
FIG. 3

Option Structure

| Output Current Threshold Options | | Output Selection Options | | Trigger Type Options | | Output Type Options | | Timer Duration Options | |
|---|---|---|---|---|---|---|---|---|---|
| OCT Disabled | Disables open circuit warnings on display | H1 | High Current output 1 selected | Ignition | Output activated by ignition | Latched | Single press to turn on, single press to turn off | Timer Disabled | Disables turn off timer |
| OCT Enabled | enables open circuit warnings on display | - | | Ign. Memory | Output set to last state at ignition off | Latch Flash | single press to activate flash / 1.5 Hz | 30s | Turns off after 30 seconds |
| | | H6 | High Current output 6 selected | Battery | output always active | Latch Strobe | single press to activate Strobe single press to deactivate Strobe (10 Hz) | 1m | Turns off after 1 minute |
| | | L1 | Low Current output 1 selected | | | Hold Strobe | normal latched function plus Strobe after ¾ button press, deactivates upon release | 2m | Turns off after 2 minutes |
| | | - | | | | Dimmer | activates PWM output and control from main screen | 3m | Turns off after 3 minutes |
| | | L6 | Low Current Output 6 selected | | | Moment | only active while button is pressed Timer and Ign. Memory options not available | 4m | Turns off after 4 minutes |
| | | | | | | Moment Flash | Flashes only while button is pressed Timer and Ign. Memory options not available | 5m | Turns off after 5 minutes |
| | | | | | | Moment Strobe | Strobes only while button is pressed Timer and Ign. Memory options not available | | |

FIG. 9

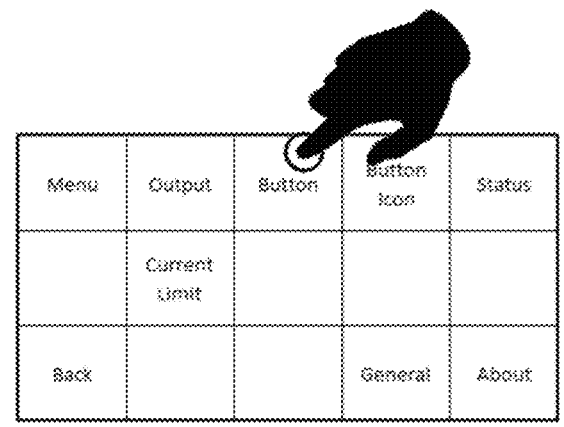
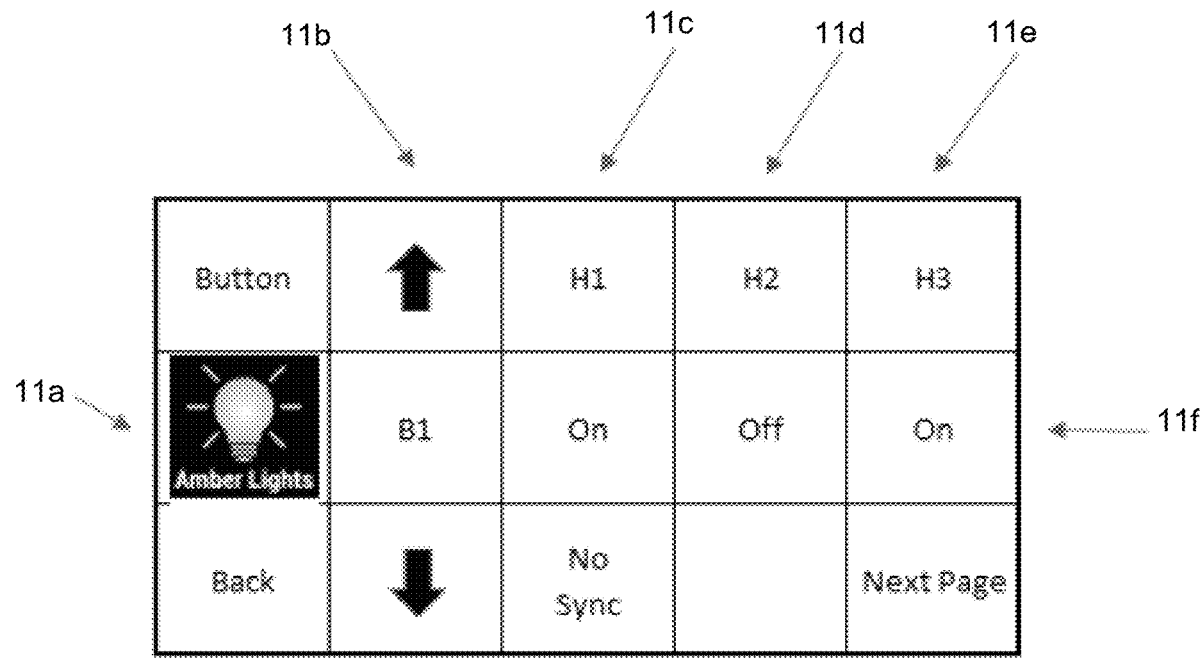
FIG. 11

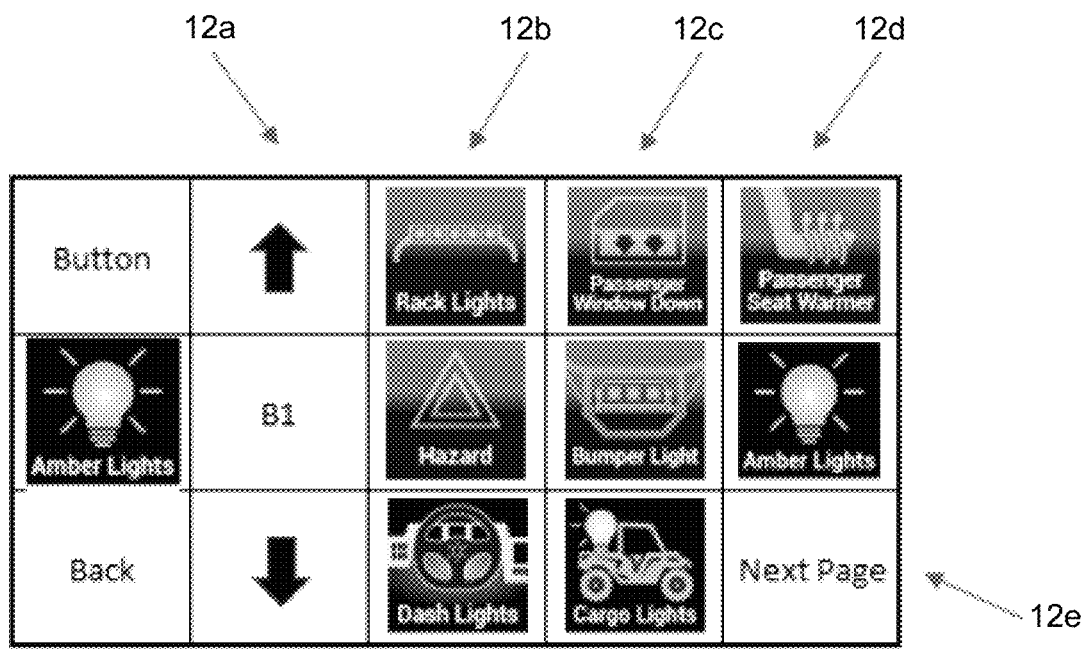
FIG. 12

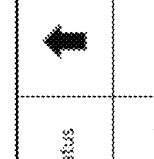
FIG. 13

FIG. 14

Menu: Current Limit
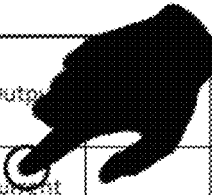
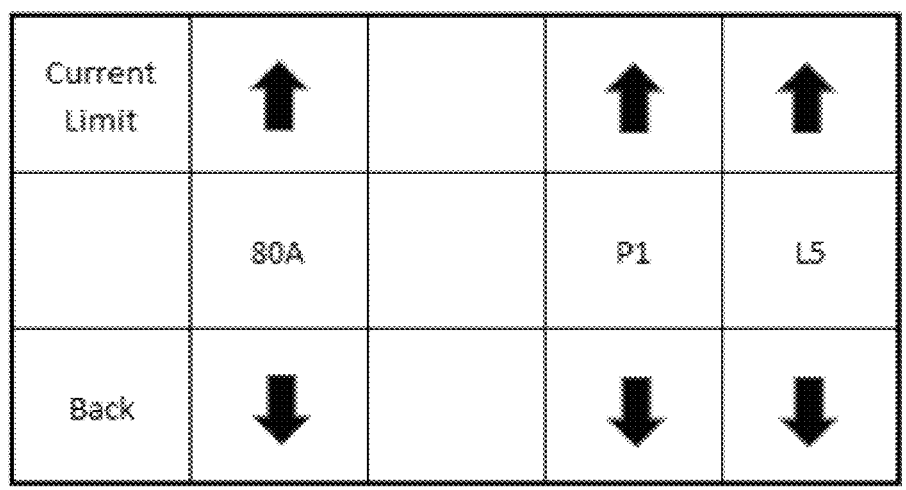
FIG. 15

PC CONFIGURATION TOOL
Screenshots:

SMART SWITCH FOR VEHICLE SYSTEMS

The present application claims priority to U.S. Provisional Patent Application No. 63/134,578 to Kaplan et al., which is fully incorporated by reference herein in its entirety.

BACKGROUND OF THE DISCLOSURE

Field of the Disclosure

The disclosure relates generally to switching systems for vehicles and, more particularly to smart switching devices and methods for controlling vehicle subsystems.

Description of the Related Art

Modern vehicles often include many different electronic subsystems or electronic control units (ECUs), some installed at the factory and others provided as after-market additions. Many vehicles may include up to different ECUs. In order to accommodate these different subsystems several different hardware components may be required (e.g., switches, controllers, knobs, etc.). Furthermore, each subsystem and its associated hardware may use different software components and/or communication protocols to function. Thus, there is a need for a universal control switch to control all of these subsystems within a vehicle using a single interface and a common communication protocol.

SUMMARY OF THE DISCLOSURE

One embodiment of a switch device according to the present disclosure is a switch device for controlling electronic control units (ECUs) in a vehicle. The device comprises a controller comprising a display plurality of buttons for receiving input, each of the buttons programmable to perform a function and to display an icon associated with that function. The device further comprises a switching box communicatively connected to the controller, the switching box comprising a plurality of outputs configured to electrically connect to the ECUs. The parameters of each of the outputs are controllable with the controller.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other systems or methods for carrying out the same purposes of the present disclosure.

These and other further features and advantages of the disclosure would be apparent to those skilled in the art from the following detailed description, taken together with the accompanying drawings, wherein like numerals designate corresponding components or steps in the figures, in which:

BRIEF DESCRIPTION OF THE DRAWINGS

FIG. 3 is a diagram showing various exemplary buttons according to an embodiment of the present disclosure in various states.

FIGS. 7-22 are examples of controller screen configurations according to an embodiment of the present disclosure.

DETAILED DESCRIPTION OF THE DISCLOSURE

Figure 1:
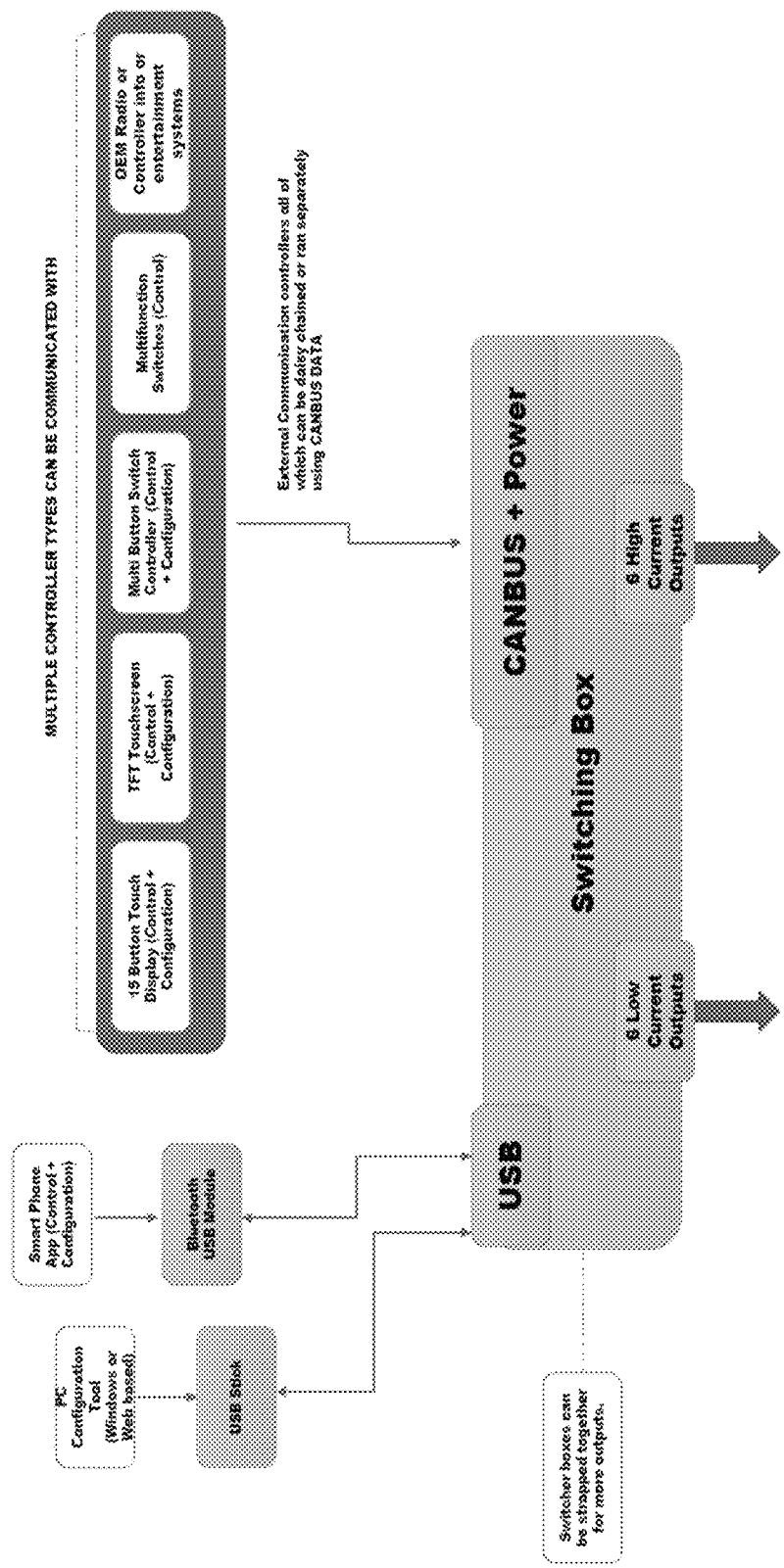
FIG. 1 is a block diagram of a smart switch device according to an embodiment of the present disclosure.

Embodiments of the present disclosure provide a smart switch devices for vehicle subsystems or electronic control units (ECUs). One embodiment of a smart switch comprises a programmable interface and a main switch box that may be controlled using the interface.

Throughout this description, the embodiments and examples illustrated should be considered as exemplars, rather than as limitations on the present disclosure. As used herein, the term "disclosure," "device," "present disclosure," or "present device" refers to any one of the embodiments of the disclosure described herein, and any equivalents. Furthermore, reference to various feature(s) of the "disclosure," "device," "present disclosure," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to different views and illustrations that are schematic illustrations of idealized embodiments of the disclosure. As such, variations from the shapes of the illustrations as a result, for example, of manufacturing techniques and/or tolerances are expected. Embodiments of the disclosure should not be construed as limited to the particular shapes of the regions illustrated herein, but are to include deviations in shapes that result, for example, from manufacturing.

FIG. 1 is a block diagram of the smart switch device 100 according to an embodiment of the present disclosure. The switch device 100 comprises a controller 120 and a switching box 140 both of which are connected to a plurality of vehicle ECUs via a CAN bus system (or CANBUS) 160 which refers to a Controller Area Network bus. A CANBUS is a robust vehicle bus standard designed to allow microcontrollers and devices to communicate with each other's applications without a host computer. CANBUS is a message-based protocol that allows for multiplex electrical wiring within automobiles. Using the CANBUS 160 allows the switch device 100 to effectively control both ECUs that are installed in the vehicle at the factory as well as ECUs that are installed as after-market additions.

As shown, the switching box 140 can be programmed in a variety of ways. For example, the USB port allows for the switching box 140 to receive programming instructions via a flash storage device (i.e., a thumbnail drive) which may include instructions downloaded from a PC, or the switching box 140 may be connected directly to a PC via USB connection. The switching box 140 may also be connected wirelessly via a USB Bluetooth dongle, for example, to an external device such as a smart phone or a tablet.

The switching box 140 can communicate with many different types of controllers. In one embodiment, the controller 120 comprises a 15-button touch display (best shown in FIG. 2). The controller 120 allows the user to easily control and configure the ECUs via the switching box 140 with a high degree of customization. Other kinds of controllers can also be used such as a TFT touchscreen, multi-button switch controller, multifunction switches, or OEM radio/controller or entertainment systems.

Figure 2:
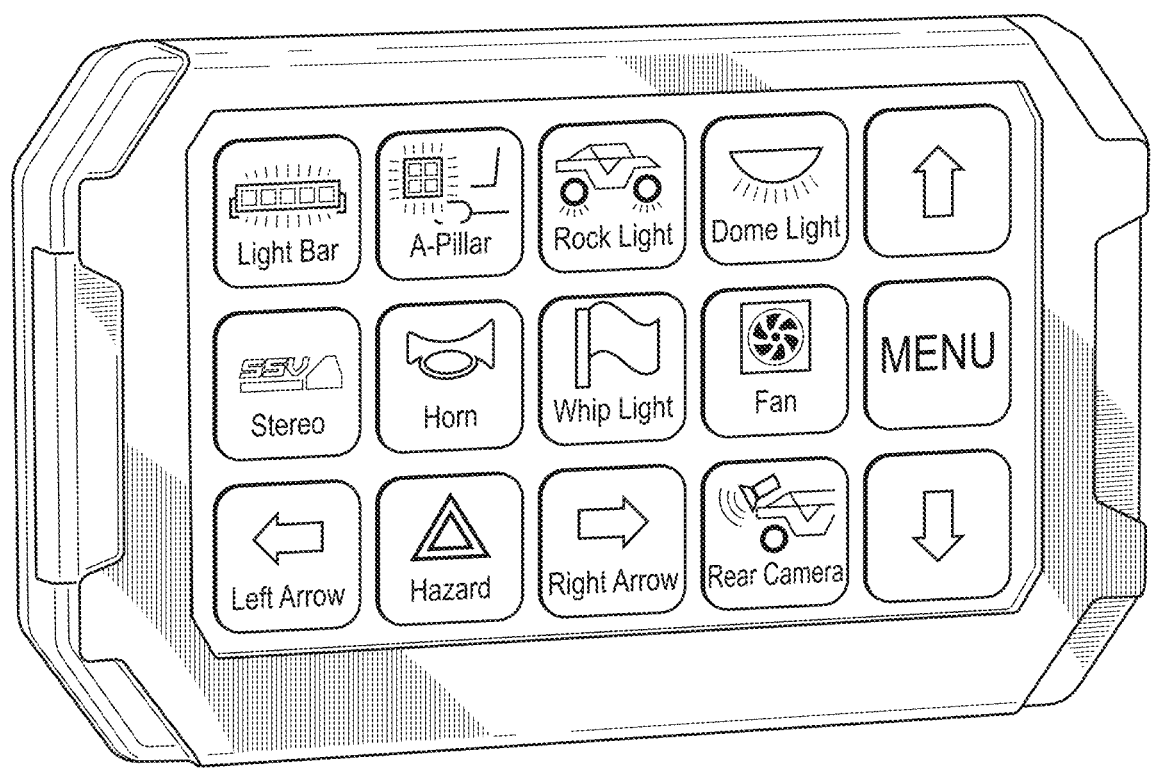
FIG. 2 shows a programmable controller according to an embodiment of the present disclosure.

FIG. 2 is a perspective view of a programmable controller 102 according to an embodiment of the present disclosure. This particular controller 120 comprises a 15-button touch display. The buttons 122 are disposed over a TFT screen. This allows the buttons 122 to be visually customized with graphics/images that correspond to the function of the button 122. As each of the buttons 122 is a "soft button," meaning that the function of any given button 122 is not static, the graphics beneath a particular button 122 may be changed as the function of that button changes.

An exemplary button configuration is shown on the controller 120 in FIG. 2. The button in the upper left hand corner includes a graphic of a vehicle light bar and the accompanying text "Light Bar" to indicate that in the current configuration, the button controls the light bar. Other buttons 122 in this configuration control the A-Pillar, the Rock Lights, the Dome Light, the Stereo, the Horn, the Whip Light, the Fan, the Left Arrow, the Right Arrow, the Hazard, and the Rear Camera. The three buttons in the column on the far right of the controller 120 are designated in this configuration as navigation buttons which allow the user to navigate to and through various other screen configurations. For example, the button labled "MENU" will take the user to a home menu screen in which each of the buttons will correspond to functions available in the home menu configuration. Because both the function and the appearance of the soft buttons 122 can be changed, any number of screens and button combinations are possible allowing for a high degree of customization. Several exemplary screen configurations are shown herein.

FIG. 3 is a diagram showing various exemplary buttons 122 in various states. In a given configuration, each button 122 may have multiple images assigned to it to reflect the state of the device (e.g. light, accessory, ECU, etc.) assigned to the button. For example, the exemplary button labeled "Amber Lights" will display one of two graphics depending on the state of the amber lights. The button will display an "on" graphic when the amber lights are on, and an "off" graphic when the lights are off. In some instances, an device may experience an error, in which the button associated with that device will display an error graphic indicating the specific nature of the error. Some buttons may be used to trigger the output of one or more other buttons. For example, a button labeled "Hazard" may be pressed to initiate operation of two devices associated with other buttons, namely the left and right blinkers labeled as "Left Arrow" and "Right Arrow."

Figure 4:
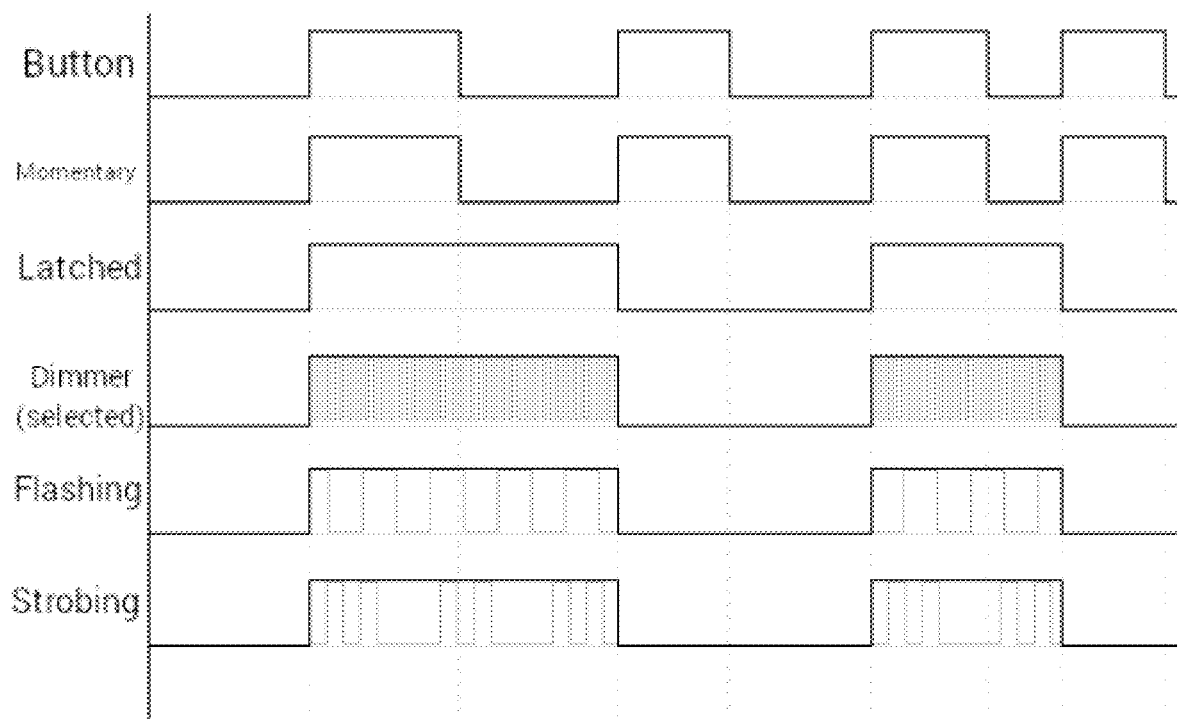
FIG. 4 is an electrical diagram showing several signal output options according to the present disclosure.

Each button in a given configuration can have a certain kind of output signal associated with it. FIG. 4 is an electrical signal diagram showing several signal output options that are transmitted in response to a button being pressed. Some of these exemplary output signal options are: momentary, latching, flashing, strobing, dimming. Many other output signal options are possible.

Figure 5:
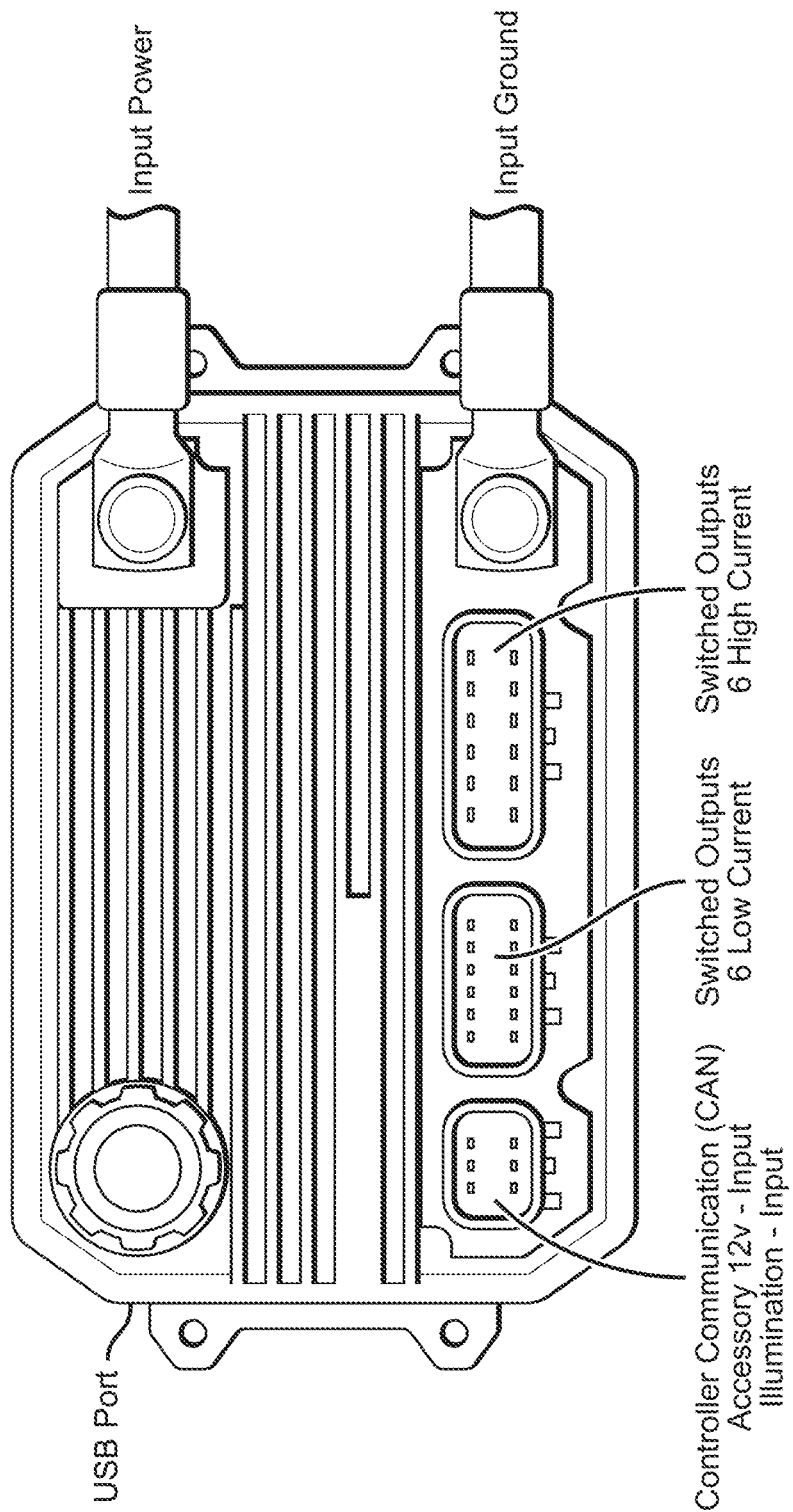

FIG. 5 is a front elevation view of the switching box 140 according to an embodiment of the present disclosure. In one embodiment, the switching box 140 is protected with an IP67 rated cast aluminum enclosure. The switching box 140 comprises a USB port 142, a controller communication input 144, a plurality of low current outputs 146, a plurality of high current outputs 148, input power 150, and input ground 152. In this particular embodiment, there are six low current outputs 146 and six high current outputs 148. It is understood that different numbers of these outputs are contemplated depending on the particular application for which the switching box 140 is designed.

Figure 6:
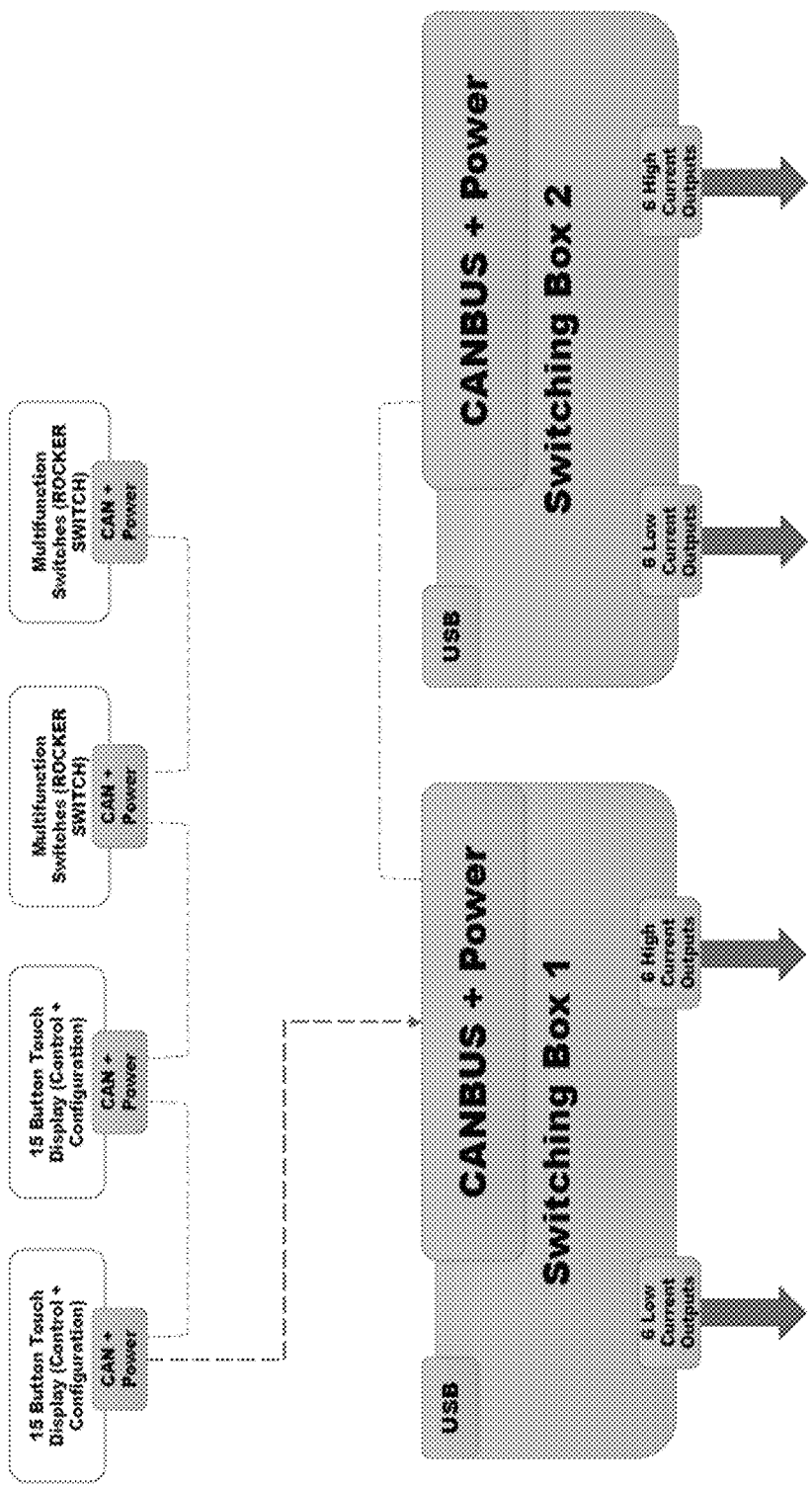
FIG. 6 is a block diagram of a switch device according to an embodiment of the present disclosure.

FIG. 6 is a block diagram of a switch device 200 according to an embodiment of the present disclosure. In this particular embodiment, multiple switching devices 240 can be connected to the CANBUS to control additional ECUs. Likewise, it is possible to daisy-chain additional controllers 220 allowing for multiple controllers 220 to be used simultaneously. The diagram represents only one of many different alternative configurations that are possible using the controllers 220 and switching boxes 240.

As previously noted, the soft buttons on the controller 120 can be changed, both visually and functionally to control various vehicle ECUs. Thus, the controller 120 interface may have many different configurations. FIGS. 7-22 provide examples of several different controller screen configurations with various output options for the buttons in each configuration.

Figure 7:
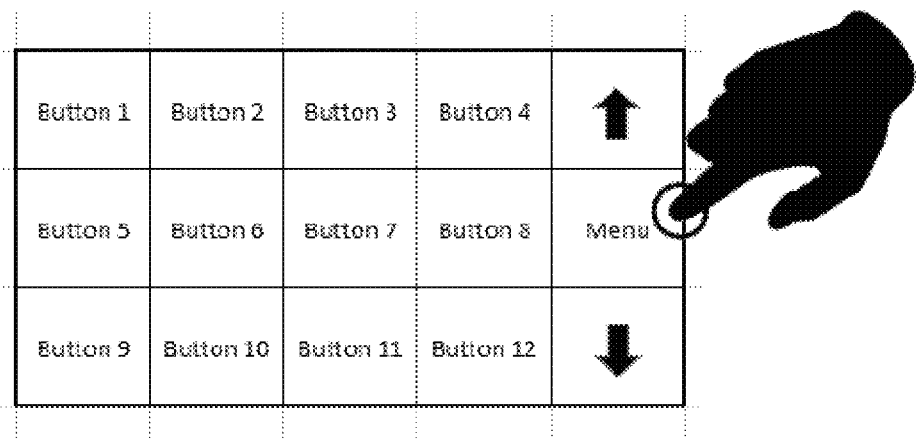

FIG. 7 is a schematic diagram of an exemplary controller interface configuration. In this configuration, by pressing the "Menu" button on the Home Screen, the top-level menu can be accessed. This configuration can be used to set up the switching box 140 as desired. The five top-level menu options are: Output, Button, Button Icon, Current Limit. The Output button is used to configure the connected outputs. The Buttons button is used to configure the button mapping. The Button Icons button is used to select the image that will be associated with a particular button. The image may be selected from a library of pre-loaded icons, or custom icons may be uploaded as desired. The Status button can be used to view the module total output status and/or to view each output's independent status. The Current Limit button may be used to adjust the current limit of the main switching module. Other buttons shown include the General button which may be used to control the presentation settings and the About button which shows the current version of the software that is running.

Figure 8:
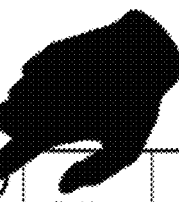

FIG. 8 is a schematic diagram of the Output screen which may be accessed by pressing the Output button on the top-level menu. Using the first set of arrows on the left 8a, the particular ECU is selected to have its output settings changed (e.g., H1-H6, L1-L6). The second set of arrows 8b may be used to select at which state the output can be operated (e.g., ignition, ignition memory, etc.). The third set of arrows 8c is used to select the output type (e.g., latched, latch flash, latch strobe, etc.). The fourth set of arrows 8d is used to select the timer duration for the selected output (e.g., timer disable, 30 seconds, 1 minute, etc.). Each of the options is detailed in FIG. 9.

FIG. 9 is a table showing the options for setting each of the outputs on the Output screen.

Figure 10:
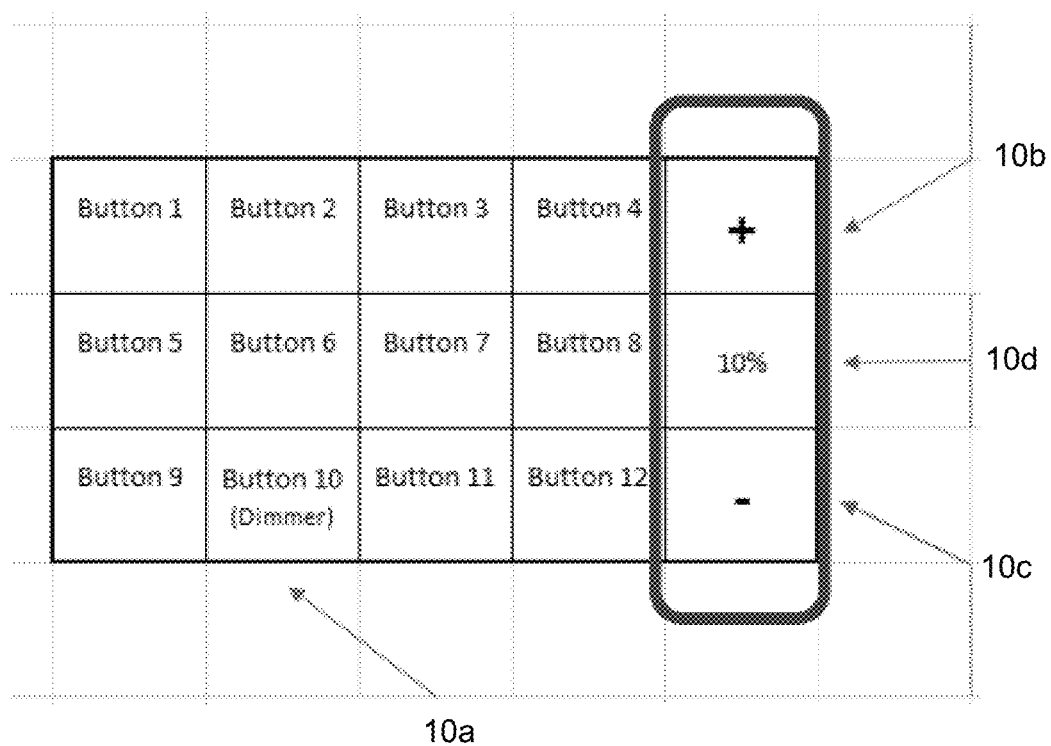
Figure 16:
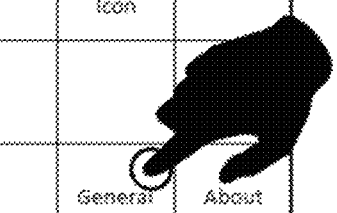
Figure 17:
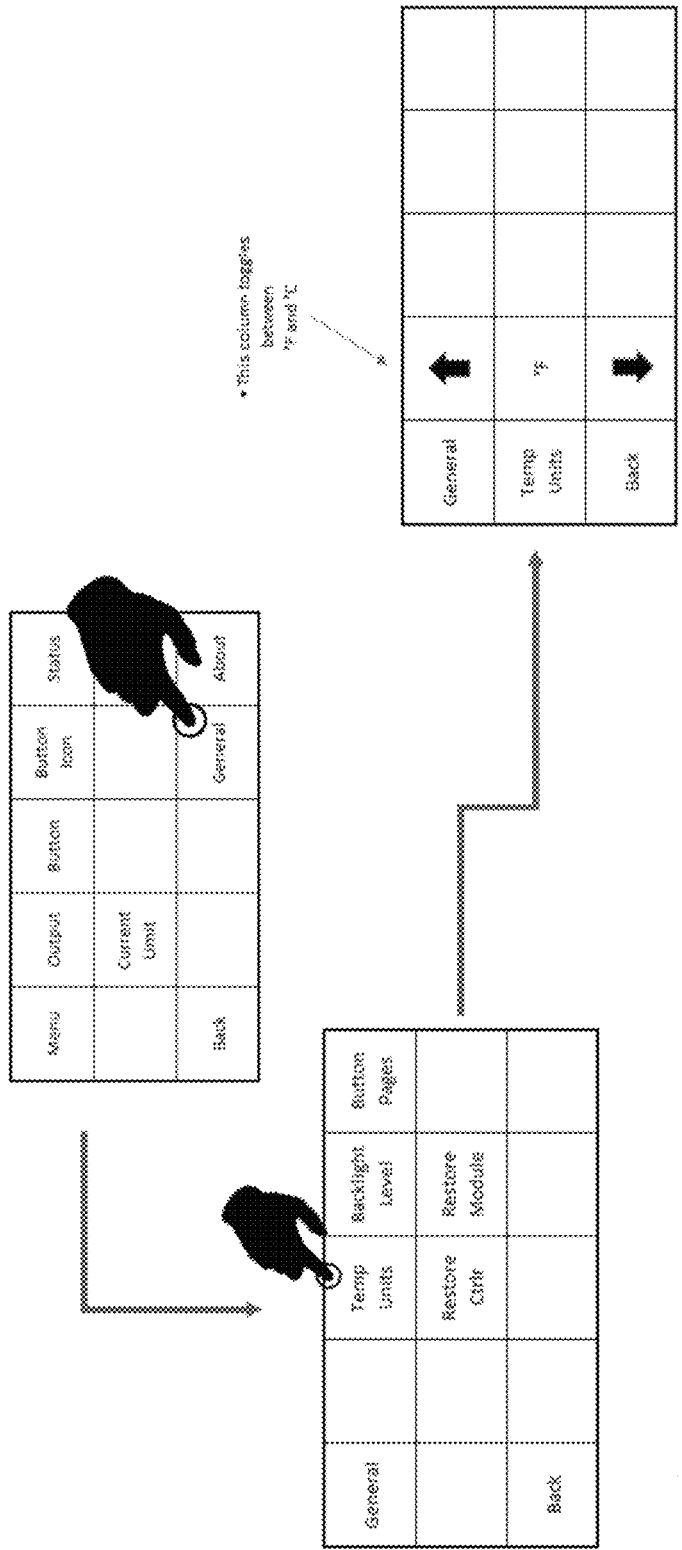
Figure 18:
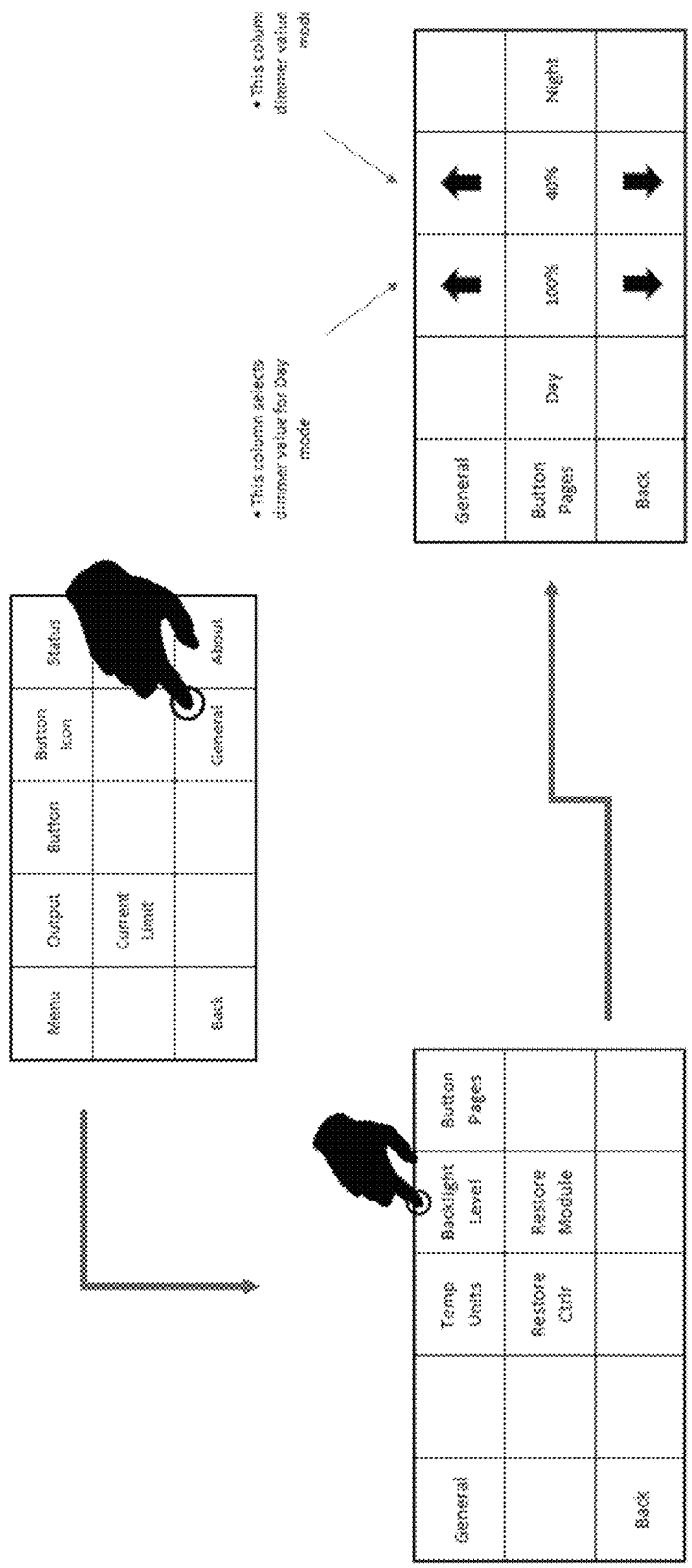
Figure 19:
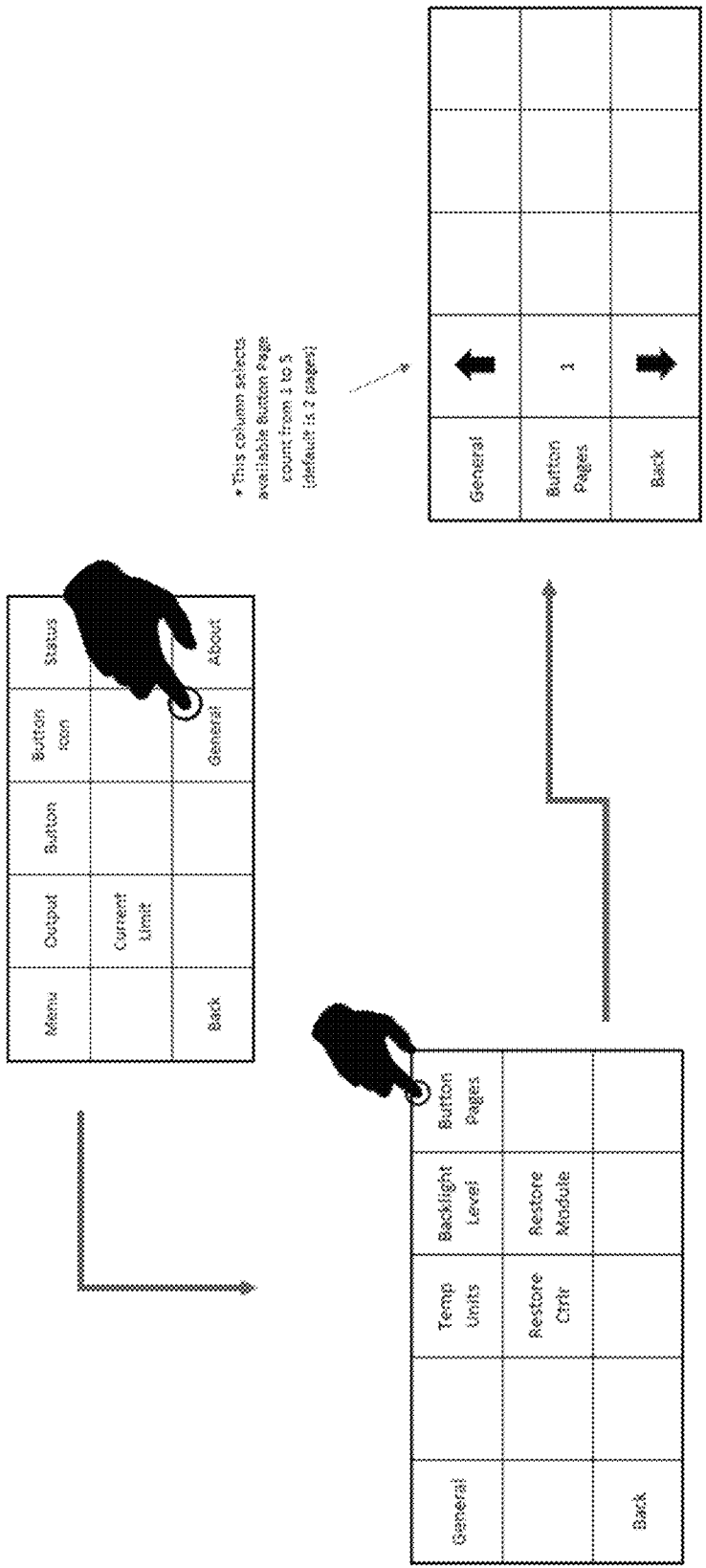
Figure 20:
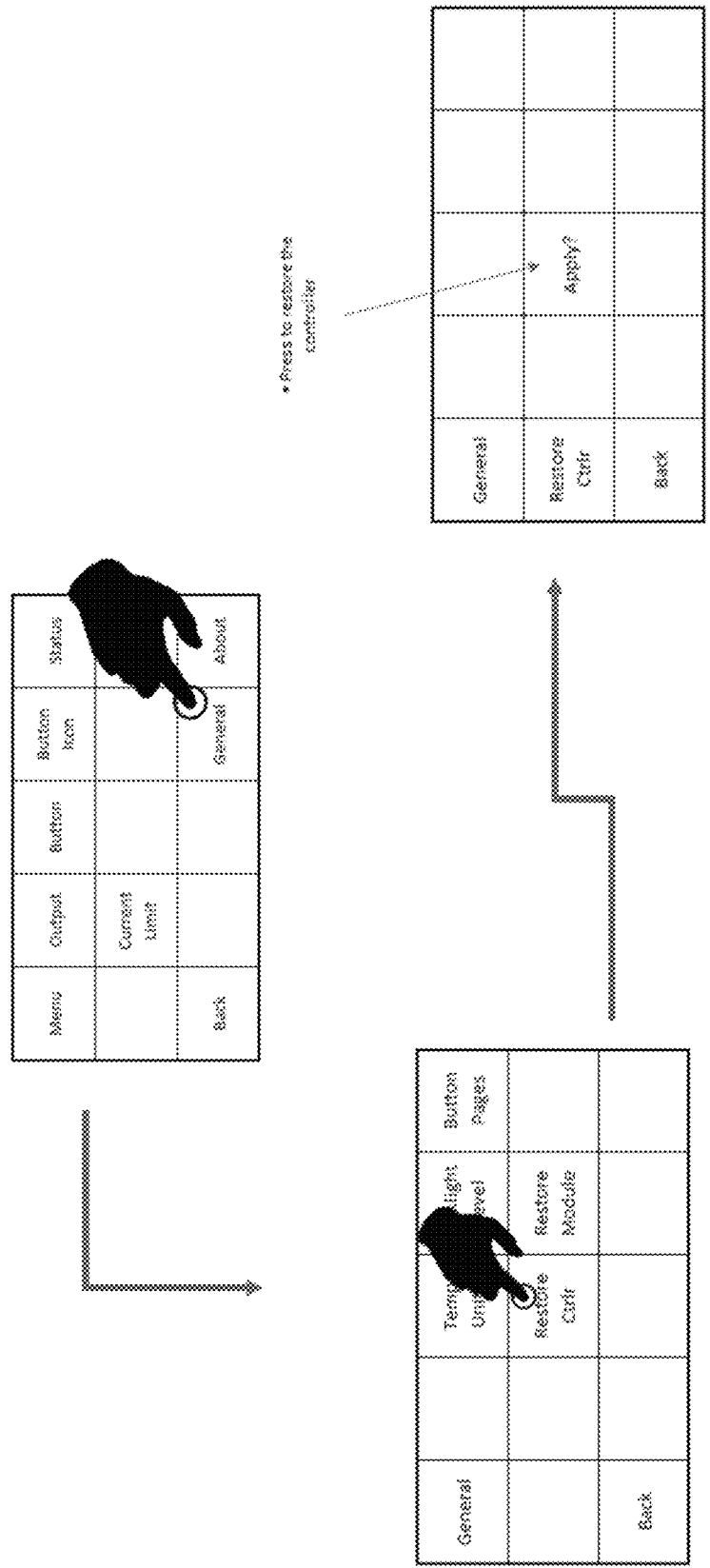
Figure 21:
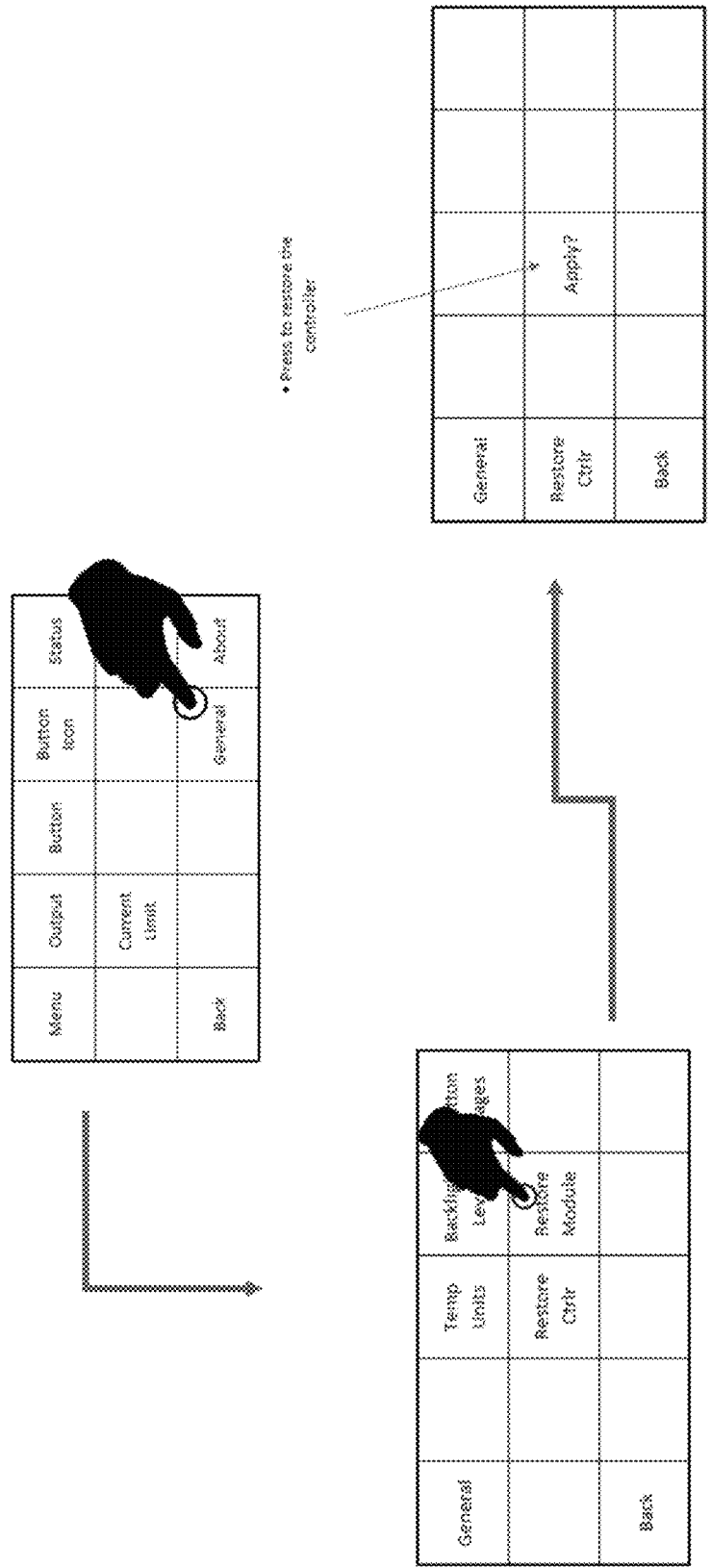
Figure 22:
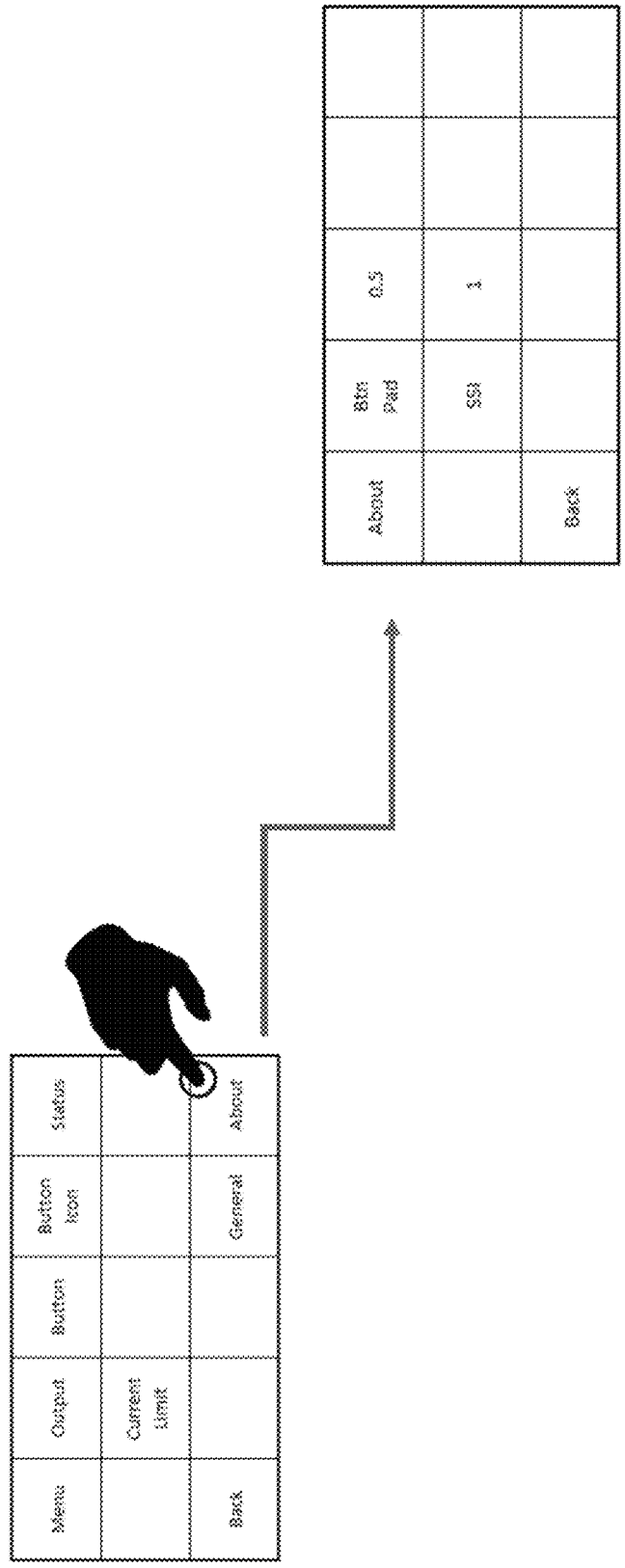

FIG. 10 is a schematic diagram of the Dimming Operation from the Output screen. When a selected button is pressed, the output toggles on and off at the current dimmer setting. To adjust the outputs dimming, the button 10a is pressed and held with the output that the dimmer function has been assigned to. The navigation buttons will change from arrows to + and – buttons 10b, 10c, which can then be used to adjust the Pulse Width Modulation (PSM) duty level 10d.

FIG. 11 is a schematic diagram of the Button screen which is accessed from the top-level menu. The center button in the first column on the left 11a displays the currently selected icon for the output. The arrows in the second column 11b allow the button to be selected for which the output will be assigned (e.g., B1, B2, etc.). The remaining buttons on the top row 11c, 11d, 11e allow selection of the outputs that will be associated with the button. The second row 11f designates an output state for each output when the associated button is pressed.

FIG. 12 is a schematic diagram of the Button Icon screen which is accessed from the top-level menu. The arrows in the second column 12a are used to select the button to which the icon will be assigned (e.g., B1, B2, etc.). The remaining columns 12b, 12c, 12d display the icons which may be selected, with the list continuing onto subsequent pages 12e.

FIG. 13 is a schematic diagram of the Status screen which is accessed from the top-level menu and the subsequent Module screen. The Module button allows the user to view the status of the particular module selected. The arrows in the second column 13a allow for selection of the desired module. The columns to the right display various operating characteristics of the module. Here the characteristics shown are temperature 13b, current 13c, and voltage 13d. These characteristics are exemplary. Various other characteristics are possible if desired.

FIG. 14 is a schematic diagram of the Status screen which is accessed from the top-level menu and the subsequent Output screen. The arrows in the second column 14a allow for selection of the desired module. The columns to the right display certain operating characteristics of the selected module. The characteristics shown here are: temperature 14b, current 14c, and dimmer level 14d.

FIG. 15 is a schematic diagram of the Current Limit screen which is accessible from the top-level menu. The arrows in the second column 15a from the left are used to select the current limit for an associated output. The arrows in the fourth column 15b are used to set the priority level associated with the selected output. The last column of arrows 15c selects the output. Each output is assigned a priority (e.g., from 1-12, with 1 being the most important to keep on and 12 being the first output to turn off). In a scenario where the module's voltage is too low, or the temperature is too high, the module will follow an assignable output priority to determine which outputs should be turned off first to preserve voltage and/or reduce heat.

FIGS. 16-22 are schematic diagrams of various exemplary screens and their related functionality (e.g., 16a, 16b, 16c, 16d, 16e). It is understood that these screens and the buttons within those screens are merely exemplary. Many other combinations of screens and buttons are possible and will be determined based on the intended application.

Figure 23A:
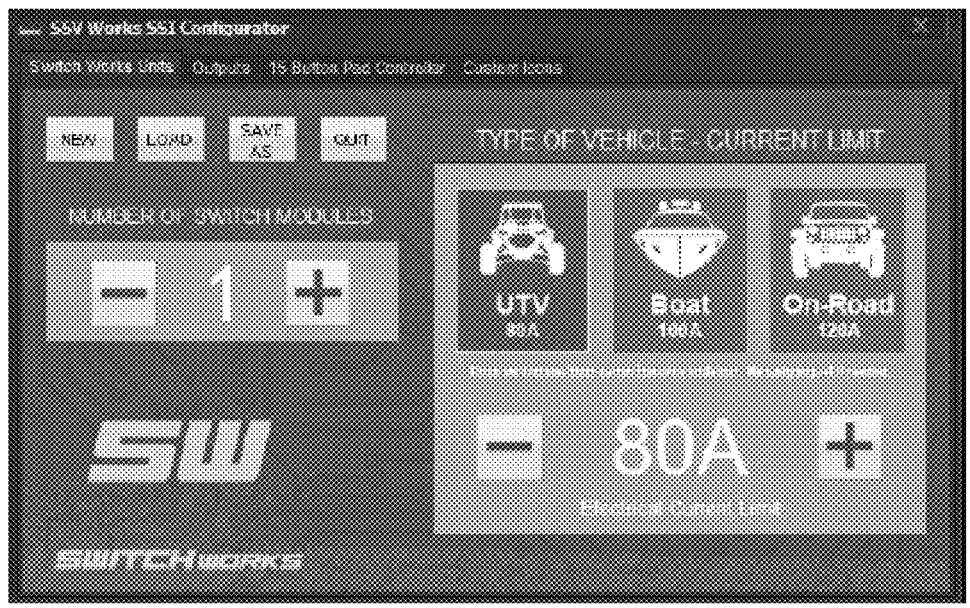
FIGS. 23A-C and 24 are examples of a selection or configuration tool according to an embodiment of the present disclosure.
Figure 23B:
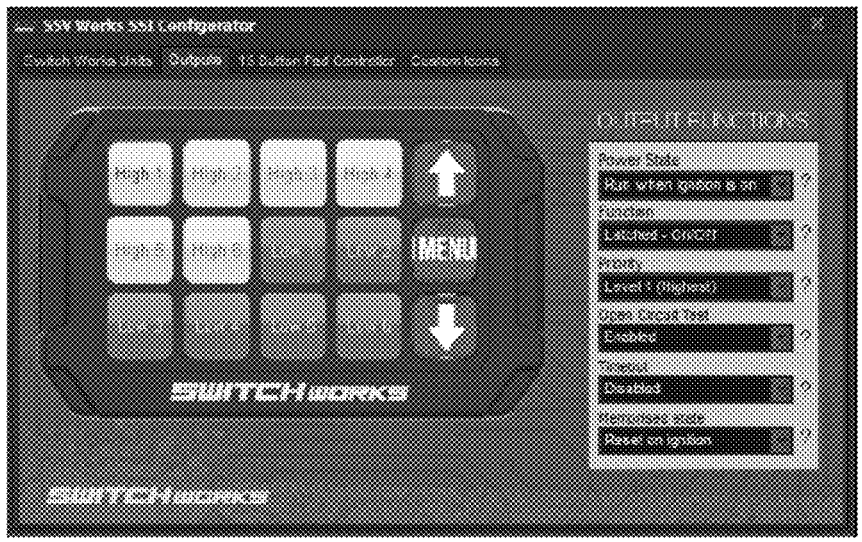
Figure 23C:
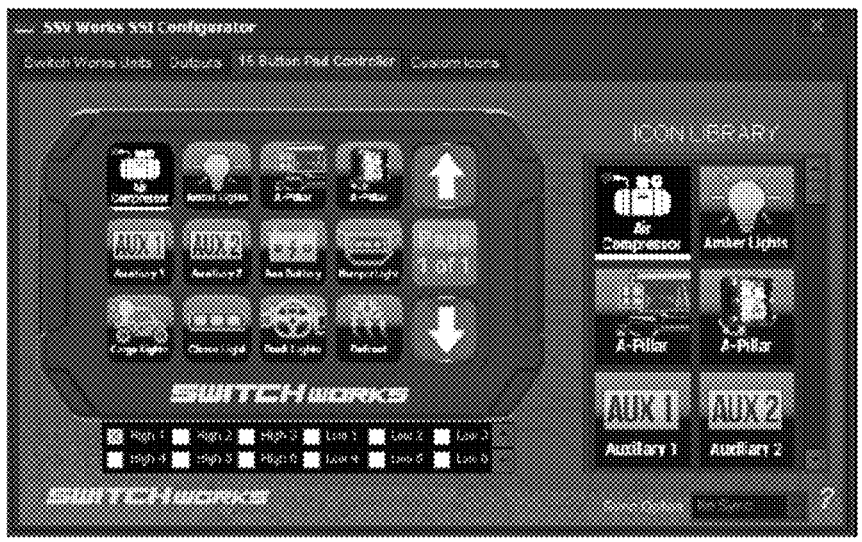
Figure 24:
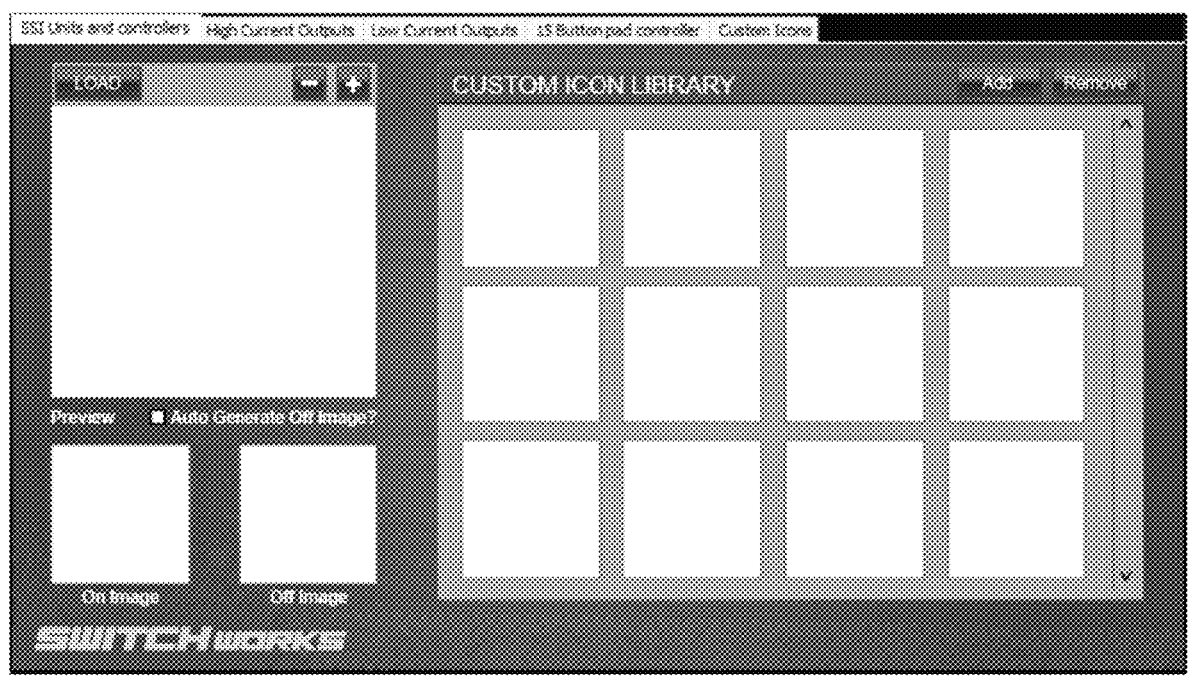

FIGS. 23A-C and 24 is a set of screenshots from a PC configuration tool according to an embodiment of the present disclosure. The PC configuration tool provides a visual interface on an external computer that allows the user to configure the controller without have to use the controller buttons. The tool provides a more intuitive method for configuration. FIG. 23A shows a selection screen which allows the user to select they type of vehicle and to set a current limit for the configuration. FIG. 23B shows a screen in which each of 12 outputs can be configured on a single screen using the drop-down fields provided. FIG. 23C shows a screen in which icons from the library can be easily assigned to the various outputs. FIG. 24 shows a screen in which a user may upload his or her own custom icons. Thus, each of the functions and configuration steps discussed herein that can be achieved by pressing certain buttons in a defined sequence, can also be achieved using the PC configuration tool in a more user-friendly way. As previously noted, the PC configuration tool can be connected to the switching box 140 and/or the controller 120 via USB connection, Bluetooth, or the like.

Although the present disclosure has been described in detail with reference to certain configurations thereof, other versions are possible. Embodiments of the present disclosure can comprise any combination of compatible features shown in the various figures, and these embodiments should not be limited to those expressly illustrated and discussed. Therefore, the spirit and scope of the disclosure should not be limited to the versions described above.

The foregoing is intended to cover all modifications and alternative constructions falling within the spirit and scope of the disclosure as expressed in the claims, wherein no portion of the disclosure is intended, expressly or implicitly, to be dedicated to the public domain if not set forth in any claims.

We claim:
1. A switch device, comprising:
  a controller comprising a plurality of buttons, each of said buttons programmable to perform at least one function and to display at least one graphic associated with said function, and wherein said functions and said graphics of each of said buttons are re-programmable from options pre-installed on said controller or from aftermarket options are subsequently loaded onto said controller; and
  a switching box communicatively connected to said controller, said switching box comprising a plurality of outputs, wherein the parameters of each of said outputs are controllable with said controller.
2. The switch device of claim 1, wherein said switch device is for controlling electronic control units (ECUs) in a vehicle.

3. The switch device of claim 1, wherein said buttons are configured on a touchscreen display.

4. The switch device of claim 3, wherein said graphics on said buttons contemporaneously change to correspond to the state of said functions associated with said buttons.

5. The switch device of claim 3, wherein the positioning of said buttons on said touchscreen display is customizable.

6. The switch device of claim 1, wherein said outputs further comprise a plurality of high current outputs and a plurality of low current inputs.

7. The switch device of claim 1, wherein said switching box further comprises a universal serial bus (USB) port, a controller communication input, input power, and input ground.

8. The switch device of claim 7, wherein said outputs of said switching box are programmable and re-programmable via said USB port.

9. A switch device, comprising:
- a programmable interface, wherein said programmable interface is also re-programmable from pre-installed options on said programmable interface or after-market options that are subsequently loaded added onto said programmable interface; and
- a switch box communicatively connected to said programmable interface, wherein said switch box is controlled by said programmable interface.

\* \* \* \* \*